US012683893B2

(12) United States Patent

Berger et al.

(10) Patent No.: US 12,683,893 B2

(45) Date of Patent: Jul. 14, 2026

(54) ROUTING MESSAGES BASED ON MESSAGE PRIORITY

(71) Applicant: Capital One Services, LLC, McLean, VA (US)

(72) Inventors: Jacob Berger, McLean, VA (US); Charles DeVore, Brooklyn, NY (US); Xiaoyi Wang, McLean, VA (US); Lindsey May, McLean, VA (US); Waleed Algadhi, McLean, VA (US); Linsu Han, New York, NY (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 18/794,218

(22) Filed: Aug. 5, 2024

(65) Prior Publication Data

US 2026/0039585 A1    Feb. 5, 2026

(51) Int. Cl.
*H04L 45/24* (2022.01)
*H04L 45/12* (2022.01)

(52) U.S. Cl.
CPC ............ *H04L 45/24* (2013.01); *H04L 45/126* (2013.01)

(58) Field of Classification Search
CPC ....................................................... H04L 45/24
See application file for complete search history.

(56) References Cited

U.S. PATENT DOCUMENTS

2013/0117420 A1* 5/2013 Han ........................ H04L 45/04
709/220
2023/0366687 A1* 11/2023 Fernandez Gonzalez ...................
G06N 20/00

FOREIGN PATENT DOCUMENTS

WO      WO-2022194397 A1 * 9/2022 ......... H04L 63/0428

* cited by examiner

*Primary Examiner* — Esther B. Henderson
(74) *Attorney, Agent, or Firm* — Foley & Lardner LLP

(57) ABSTRACT

Methods and systems for routing messages based on message priority. In some aspects, the system may determine paths between a source and one or more destinations. The system may determine, for a first message, using a machine learning model, a first predicted path having a first distance. The system may determine, based on the first predicted path, using a Markov decision process, a priority of the first message. Based on determining that a first confidence score for the first predicted path does not exceed a threshold, the system may select a different path for the first message. The system may select the different path based on the priority of the first message and a second distance associated with the different path. The system may then re-direct the first message along the different path.

20 Claims, 7 Drawing Sheets

<u>700</u>

100

204

ML Model 202

206

300

400

500

<u>700</u>

ROUTING MESSAGES BASED ON MESSAGE PRIORITY

SUMMARY

Data packets traveling within a network may take various pathways to travel between a source and a destination. For example, a pathway through a network may include a sequence of nodes that data packets traverse from source to destination. In the context of computer networks, these nodes may be various types of hardware devices, such as routers, switches, bridges, and gateways. A system may route a data packet down a particular pathway based on network traffic, congestion, encryption of pathways, or other factors. For example, selecting the pathway for a data packet may depend on a priority of a data packet. However, a priority of a given data packet may change over time based on a myriad of factors. Thus, selecting the correct pathway for the data packet requires an accurate assessment of the data packet's priority. Current systems are limited in their ability to accurately predict priorities of data packets in a dynamic manner. This technical limitation may present an inherent problem with attempting to route messages based on priority.

Accordingly, methods and systems are described herein for facilitating routing of messages based on priorities. In particular, the methods and systems facilitate routing a message along different paths based on the priority of the message.

Existing systems lack the technical ability to dynamically predict priority of data such that data packets may be routed down appropriate pathways within a network. Without an accurate understanding of priority, data packets may be routed along inappropriate pathways. For example, if high-priority packets, such as those for real-time applications, are not correctly identified and given precedence, they may experience delays. Conversely, if lower-priority traffic, such as file downloads or email, is mistakenly treated as high priority, unnecessary congestion on the network may result. This misallocation of resources may not only degrade the performance of critical applications but also reduce the overall efficiency of the network. Additionally, if emergency or critical data is not prioritized correctly, responses to critical situations may be delayed, potentially leading to safety hazards or operational disruptions. In scenarios where network security relies on the timely delivery of certain packets, failing to prioritize these packets may weaken the network's security. Thus, accurately understanding and implementing packet priority is essential for maintaining the quality, efficiency, and security of networks.

To overcome these technical deficiencies, methods and systems disclosed herein utilize a Markov decision process (MDP) to dynamically assess priority of data. For example, methods and systems may use dynamic programming to calculate priorities associated with counter-factual scenarios, thereby providing a more accurate prediction of priority. Using this priority, methods and systems may route data packets along appropriate pathways. The methods and systems may route the data packets based on priority of the data packet, the distance of each pathway, and a desired destination. A data packet may be re-routed based on new information causing a change to the priority of the data packet. In some embodiments, methods and systems may additionally account for rules and may route data packets using methods that are in compliance with those rules. This enables routing systems to maintain the quality, efficiency, and security of networks.

In some aspects, a message routing system may determine paths for routing messages from a source to one or more destinations. Each path may be associated with a respective distance between the source and a respective destination. The message routing system may use a first machine learning model to determine, for a first message, a first predicted path. The first predicted path may connect the source and a first predicted destination of the one or more destinations. The message routing system may determine, based on the first predicted path, a priority of the first message using an MDP. In some embodiments, the MDP may utilize agent input and a probabilistic determination to determine the priority. The message routing system may determine whether the first predicted path is appropriate for the first message based on the priority of the first message. For example, the message routing system may determine whether a first confidence score associated with selecting the first predicted path for the first message exceeds a threshold. In some embodiments, the message routing system may determine the first confidence score based on the priority of the first message, a first distance associated with the first predicted path, and the first predicted destination. Based on determining that the first confidence score for the first predicted path does not exceed the threshold, the message routing system may select a different path for the first message. The different path may connect the source with a different destination (e.g., a second predicted destination). The message routing system may select the different path based on the priority of the first message, a second distance associated with the different path, and the second predicted destination, and a second confidence score for the different path may exceed the threshold. Thus, the message routing system may route the first message down a path (e.g., the different path) that is appropriate given the priority of the first message.

Various other aspects, features, and advantages of the systems and methods described herein will be apparent through the detailed description and the drawings attached hereto. It is also to be understood that both the foregoing general description and the following detailed description are examples and are not restrictive of the scope of the disclosure. As used in the specification and in the claims, the singular forms of "a," "an," and "the" include plural references unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

DETAILED DESCRIPTION

In the following description, for the purposes of explanation, numerous specific details are set forth in order to provide a thorough understanding of the embodiments of the systems and methods described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
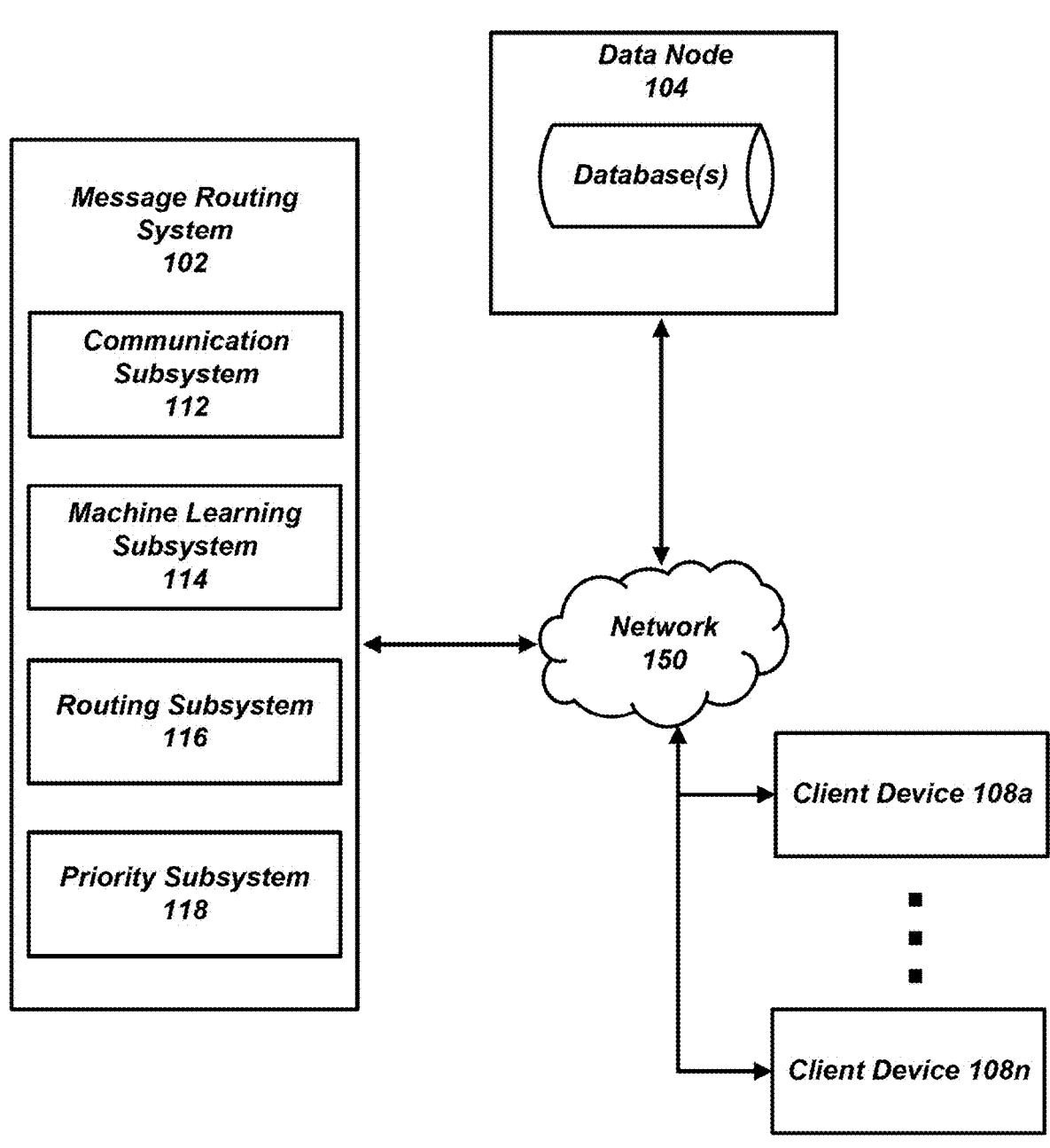
FIG. 1 shows an illustrative system for routing candidates based on priorities, in accordance with one or more embodiments.

FIG. 1 shows an illustrative system 100 for routing candidates based on priorities, in accordance with one or more embodiments. System 100 may include message routing system 102, data node 104, and client devices 108*a*-108*n*. Message routing system 102 may include communication subsystem 112, machine learning subsystem 114, routing subsystem 116, priority subsystem 118, and/or other subsystems. In some embodiments, only one client device may be used, while in other embodiments, multiple client devices may be used. Client devices 108*a*-108*n* may be associated with one or more users. Client devices 108*a*-108*n* may be associated with one or more user accounts. In some embodiments, client devices 108*a*-108*n* may be computing devices that may receive and send data via network 150. Client devices 108*a*-108*n* may be end-user computing devices (e.g., desktop computers, laptops, electronic tablets, smartphones, and/or other computing devices used by end users). Client devices 108*a*-108*n* may output (e.g., via a graphical user interface) run applications, output communications, receive inputs, or perform other actions.

In some aspects, message routing system 102 may determine paths for routing messages from a source to one or more destinations. Each path may be associated with a respective distance between the source and a respective destination. Message routing system 102 may use a first machine learning model to determine, for a first message, a first predicted path. The first predicted path may connect the source and a first predicted destination of the one or more destinations. Message routing system 102 may determine, based on the first predicted path, a priority of the first message using a Markov decision process (MDP). In some embodiments, the MDP may utilize agent input and a probabilistic determination to determine the priority. Message routing system 102 may determine whether the first predicted path is appropriate for the first message based on the priority of the first message. For example, message routing system 102 may determine whether a first confidence score associated with selecting the first predicted path for the first message exceeds a threshold. In some embodiments, message routing system 102 may determine the first confidence score based on the priority of the first message, a first distance associated with the first predicted path, and the first predicted destination. Based on determining that the first confidence score for the first predicted path does not exceed the threshold, message routing system 102 may select a different path for the first message. The different path may connect the source with a different destination (e.g., a second predicted destination). Message routing system 102 may select the different path based on the priority of the first message, a second distance associated with the different path, and the second predicted destination, and a second confidence score for the different path may exceed the threshold. Thus, message routing system 102 may re-direct the first message from the first predicted path to the different path. In some embodiments, methods and systems may additionally account for rules (e.g., local, state, and federal regulations, internal organization rules, or other rules) and may re-direct messages using methods that are in compliance with those rules.

Message routing system 102 may execute instructions for routing messages based on message priority. Message routing system 102 may include software, hardware, or a combination of the two. For example, communication subsystem 112 may include a network card (e.g., a wireless network card and/or a wired network card) that is associated with software to drive the card. In some embodiments, message routing system 102 may be a physical server or a virtual server that is running on a physical computer system. In some embodiments, message routing system 102 may be configured on a client device (e.g., a laptop computer, a smartphone, a desktop computer, an electronic tablet, or another suitable client device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server or a virtual server that is running on a physical computer system. In some embodiments, message routing system 102 and data node 104 may reside on the same hardware and/or the same virtual server/computing device. Network 150 may be a local area network (LAN), a wide area network (WAN; e.g., the Internet), or a combination of the two.

In some embodiments, message routing system 102 (e.g., routing subsystem 116) may determine paths for routing candidates from a source to one or more destinations. For example, candidates may be data packets, messages, files, or other data. In some embodiments, candidates may be people, such as customers, within an organization. A source may be an originating point of data within a network. For example, a source may be a computer, a server, a handheld device, a printer or scanner, a router or switch, a network storage device, a medical device, or another device. In some embodiments, the source may be a current location of data within a network. In some embodiments, a source may be a current status (e.g., a current state of a customer). Each destination may be an endpoint or target location where the data may be delivered. For example, a destination may be a computer, a server, a handheld device, a printer or scanner, a router or switch, a network storage device, a medical device, or another device. In some embodiments, each destination may be a future status (e.g., a future state of a customer). Destinations may, for example, include charging off, debt collection, credit limit increases, account closure, approval of applications, or other destinations.

Each path of the plurality of paths may be associated with a respective distance between the source and a respective destination. In some embodiments, each respective distance may represent a cost associated with routing data down that path. For example, routing a message down a first path that has a longer distance from source to destination may be more costly than routing the message down a second path that has a shorter distance from source to destination. In some embodiments, each respective distance may represent time associated with that path. In some embodiments, each path may represent a series of user interactions with data packets. For example, a data packet may be a system that calls a user or sends a notification through an application. Routing subsystem 116 may select a pathway that optimizes user interaction with these data packets. For example, a certain ordering or schedule of the data packets may increase the likelihood that a user will interact with the data packets or take a certain action in response to the data packets. In some embodiments, the goal of optimizing user interaction with these data packets may lead to routing subsystem 116 selecting one pathway over another.

In some embodiments, routing subsystem 116 may determine, for a first candidate, a first predicted path. In some embodiments, the first predicted path may be a path that the first candidate is expected to follow. The first predicted path may include physical or logical links that connect different network devices. These links may be wired (e.g., Ethernet cables) or wireless (e.g., Wi-Fi or cellular connections). The links may connect a series of nodes along the pathway. Nodes may be active devices (e.g., routers, switches, or gateways) that a packet encounters on the pathway. Each node may have the responsibility of forwarding the packet closer to its destination. In some embodiments, a predicted pathway may be based on information associated with the first candidate. For example, the information may indicate past pathways of the data (e.g., a pathway the data followed to arrive at the source). The information about the candidate may influence the path it follows. For example, packet size, source address, destination addresses, payload, requirements, or other information may influence the pathway the first candidate is predicted to take. Information about the network may influence the path the candidate follows. For example, protocols, load balancing, congestion, routing tables, routing algorithms, network policies, or other information about the network may influence the pathway the first candidate is predicted to take. In some embodiments, routing subsystem 116 may use a machine learning model to determine the first predicted path.

Figure 2:
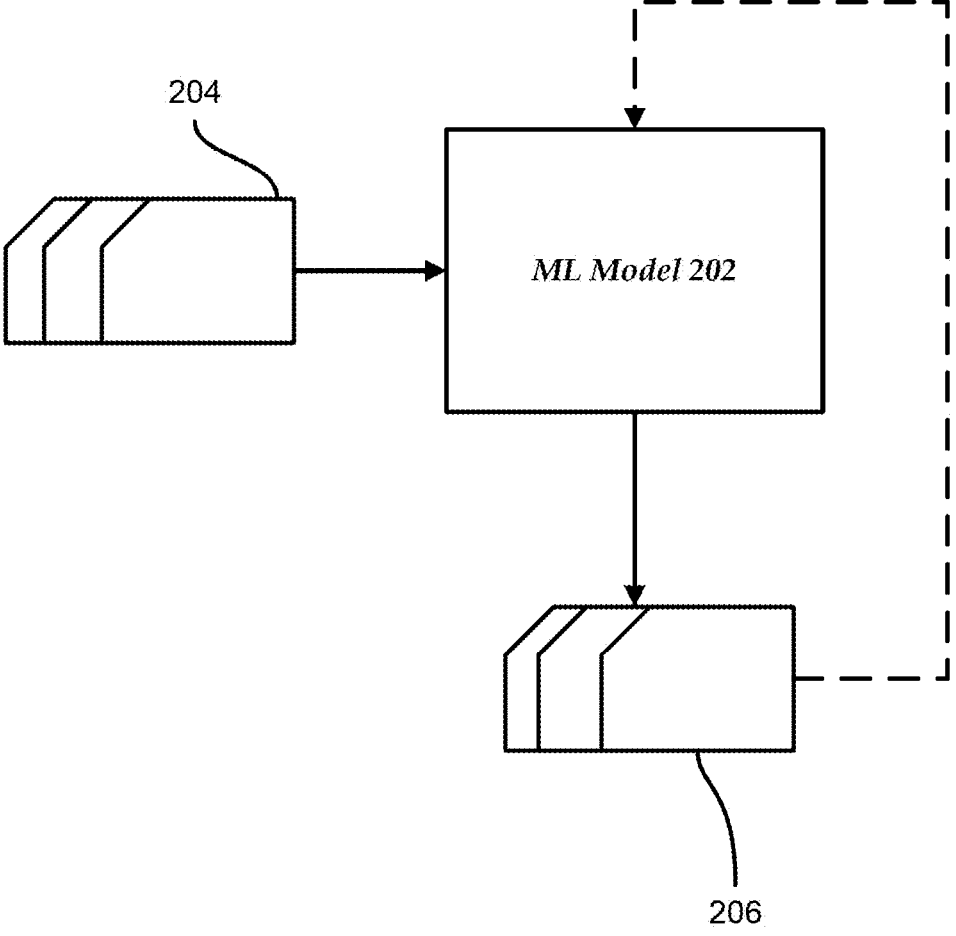
FIG. 2 illustrates an exemplary machine learning model, in accordance with one or more embodiments.

FIG. 2 illustrates an exemplary machine learning model 202, in accordance with one or more embodiments. In some embodiments, machine learning model 202 may be included in machine learning subsystem 114 or may be associated with machine learning subsystem 114. Machine learning model 202 may take input 204 (e.g., data associated with a first candidate) and may generate outputs 206 (e.g., a first predicted path of the first candidate). The output parameters may be fed back to the machine learning model as inputs to train the machine learning model (e.g., alone or in conjunction with user indications of the accuracy of outputs, labels associated with the inputs, or other reference feedback information). In some embodiments, machine learning model 202 may use continuous data feedback to update its configurations. As an illustrative example, machine learning subsystem 114 may collect data during a process of contacting a customer (e.g., sending a message or calling a user) and measuring the results. Machine learning subsystem 114 may feed this data back into the model to cause the model to update. Machine learning subsystem 114 may perform this process continuously to cause machine learning model 202 to update based on results of the customer contacts. The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

In some embodiments, the first predicted path (e.g., output by machine learning model 202) may connect the source and a first predicted destination of the one or more destinations. For example, a predicted pathway may include a predicted destination (e.g., an outcome for a candidate). In some embodiments, a predicted path may connect a source with a destination selected for a candidate. For example, a candidate may need to travel from a source to a particular destination. The predicted path may thus connect the source with the particular destination along a series of nodes and links. In some embodiments, a first predicted destination may be evident based on the first predicted path. In some embodiments, the first predicted destination may be determined in another manner.

Figure 3:
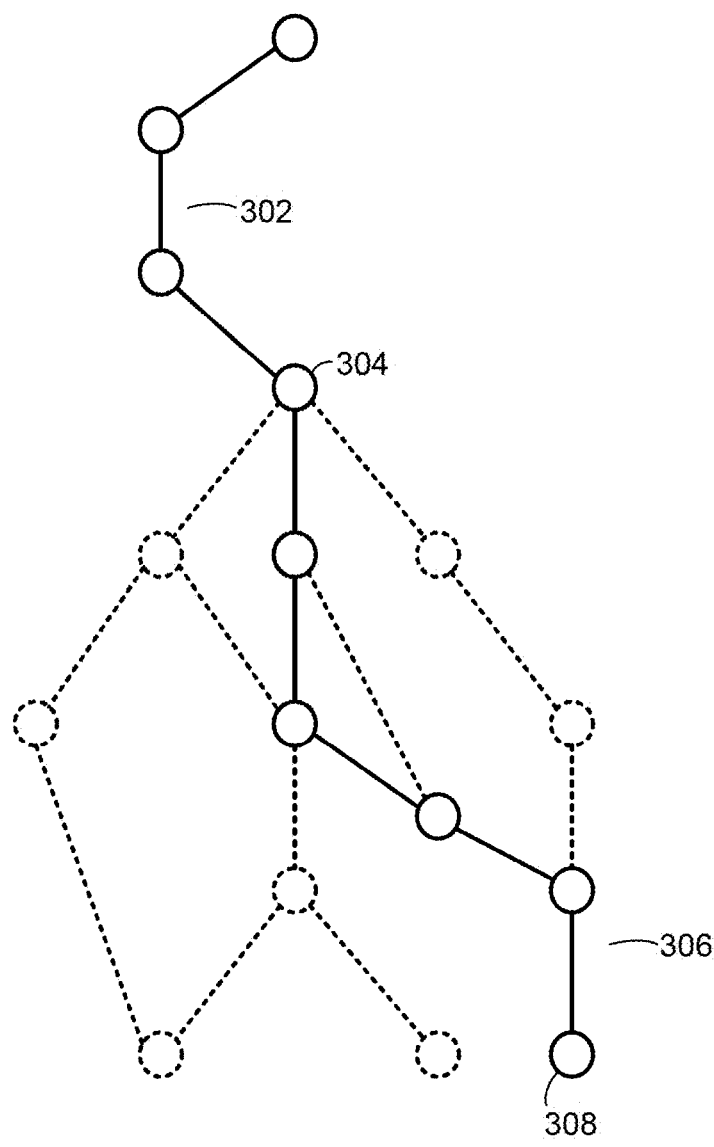
FIG. 3 illustrates a first predicted path between a source and a first destination, in accordance with one or more embodiments.

FIG. 3 illustrates a first predicted path 306 between a source 304 and a first destination 308, in accordance with one or more embodiments. In some embodiments, FIG. 3 may include a plurality of paths 300. Plurality of paths 300 may include path 302 that a candidate has already followed to reach source 304. For example, the candidate may have originated at another point (e.g., the start of path 302). In some embodiments, source 304 may be a current location or a new starting point of the candidate. In some embodiments, multiple paths may connect source 304 with first destination 308, including first predicted path 306. For example, first predicted path 306 may connect source 304 and first destination 308 via a series of nodes and links. As previously discussed, each node may represent a router, switch, bridge, gateway, or other device. Each link may represent a connection (e.g., wired or wireless) between devices. In some embodiments, first predicted path 306 may represent a route that a candidate is expected to follow (e.g., as output by machine learning model 202, as shown in FIG. 2). In some embodiments, first destination 308 may represent a predicted outcome for the candidate. As an illustrative example, source 304 may represent a current status of a person within an organization. Path 302 may represent the person's history within the organization, with the nodes representing past actions or steps taken by the person with respect to the organization. Examples of past actions may include opening an account with the organization, depositing resources into the account, making payments on the account, closing an account, or other actions. Source 304 may represent the current status of the person within the organization. For example, the current status may include two accounts, one of which is overdrawn. In some embodiments, first predicted path 306 may represent a series of future expected actions for the person. For example, nodes along first predicted path 306 may include late payments, requests for extensions, calls to customer service, or other actions. In some embodiments, links between nodes may represent actions taken by the organization that may influence a node that follows. For example, a phone call to remind the person of an approaching due date may increase the likelihood of an on-time payment and decrease the likelihood of a late payment. In some embodiments, a phone call may alienate the person and increase the likelihood of the person charging off. In some embodiments, first destination 308 may include an outcome expected for the person. For example, first destination 308 may include the person charging off. In some embodiments, the other paths of plurality of paths 300 may include other possible future actions and other possible outcomes.

In some embodiments, message routing system 102 (e.g., priority subsystem 118) may determine, based on the first predicted path, a priority of the first candidate. For example, a priority may be a relative importance compared to other candidates within the network. This prioritization may be particularly important in scenarios where network resources are constrained or specific data types need expedited handling. If a packet is marked with high priority, it may be processed and transmitted more swiftly by routers and switches, ensuring reduced latency and improved performance for time-sensitive data (e.g., voice or video streams). Conversely, packets with lower priority may experience delays or be queued during periods of high network congestion. Priority levels may be set according to the type of service field in a data packet's header, which routers and switches may then interpret to make routing decisions. For example, if a network were to support Quality of Service (QoS) protocols, these may actively manage packet priorities, ensuring that high-priority traffic, such as real-time communications, maintains its quality by receiving preferential treatment over less critical data, such as standard file transfers. Therefore, the priority assigned to a data packet significantly influences its pathways through the network, balancing the need for efficiency and the requirements of various types of network traffic.

In some embodiments, priority subsystem 118 may use a Markov decision process (MDP) to determine priority. The MDP may use probabilistic determinations to determine a priority of a candidate. For example, priority subsystem 118 may use the MDP to model the network's state and decision-making process as a series of probabilities and rewards.

Each state in this context may represent a specific set of network conditions, such as traffic load, types of data packets waiting for transmission, available bandwidth, the status of network nodes, or other conditions. The actions may be the various routing decisions, including prioritization of certain packets. In such a model, transition probabilities may be crucial. These probabilities may represent the likelihood of moving from one network state to another after taking a specific action, for example, prioritizing a video packet over a standard data packet under high network congestion. As the network conditions change, these probabilities may dynamically adjust, reflecting the evolving nature of the network. In some embodiments, the MDP may include a reward function. This function may quantify the benefit or cost of taking certain actions in specific states. For example, prioritizing time-sensitive packets might yield a higher reward in states where network congestion is high, as it would help maintain QoS. By continuously observing the network's state and making decisions based on the expected rewards, an MDP-based system may aim to optimize packet routing. This optimization may involve assigning priorities to packets in a way that balances the need for efficient network utilization with the QoS requirements of different types of data. For example, a goal may be to ensure that high-priority packets, such as those for real-time applications, are routed expediently, especially under challenging network conditions, while still maintaining overall network performance.

In some embodiments, the MDP may use agent input. The agent may be an entity that interacts with the network to make routing decisions. For example, the agent may continuously observe the current state of the network. This may include monitoring network conditions such as traffic load, bandwidth availability, types of data packets in the queue, network latency, and the status of routers and switches. Based on these observations, the agent may then evaluate possible actions, such as assigning different priorities to packets. In scenarios where the agent employs reinforcement learning, the agent may learn from the outcomes of its actions. For example, if prioritizing certain types of packets led to improved network efficiency or maintained service quality, the agent may receive a positive reinforcement (e.g., reward), encouraging similar decisions in the future. Furthermore, the agent's decision-making may be dynamic, adjusting to fluctuating network conditions. If, for example, network congestion were to increase suddenly, the agent may prioritize packets differently compared to times of lower congestion.

In some embodiments, the MDP may rely on a model of a candidate's behavior (e.g., the first predicted path) to determine the priority of the candidate. For example, the first predicted path may be a personalized prediction of a candidate's behavior or pathway in the short term (e.g., 1-30 days). In some embodiments, the MDP may thus rely on first predicted path 306, as shown in FIG. 3, to determine priority. First predicted path 306 may illustrate future actions of the candidate, future value of the candidate, or other information about the candidate. The MDP may rely on first predicted path 306 when assessing which transitions are likely given a particular action in a particular state. For example, the MDP may assign transition probabilities based on the first predicted path. This may allow the MDP to assign a priority to a candidate that reflects the behavior or predicted path of the candidate. In some embodiments, the MDP may calculate priorities associated with counter-factual scenarios, thereby providing a more accurate prediction of priority. For example, the MDP may calculate the priority of the candidate based on one or more different pathways. The MDP may calculate the priority of the candidate based on different actions or behaviors (e.g., past or future) of the candidate. The MDP may thereby assess the priority of the candidate according to various counter-factual scenarios (e.g., various paths).

Figure 4:
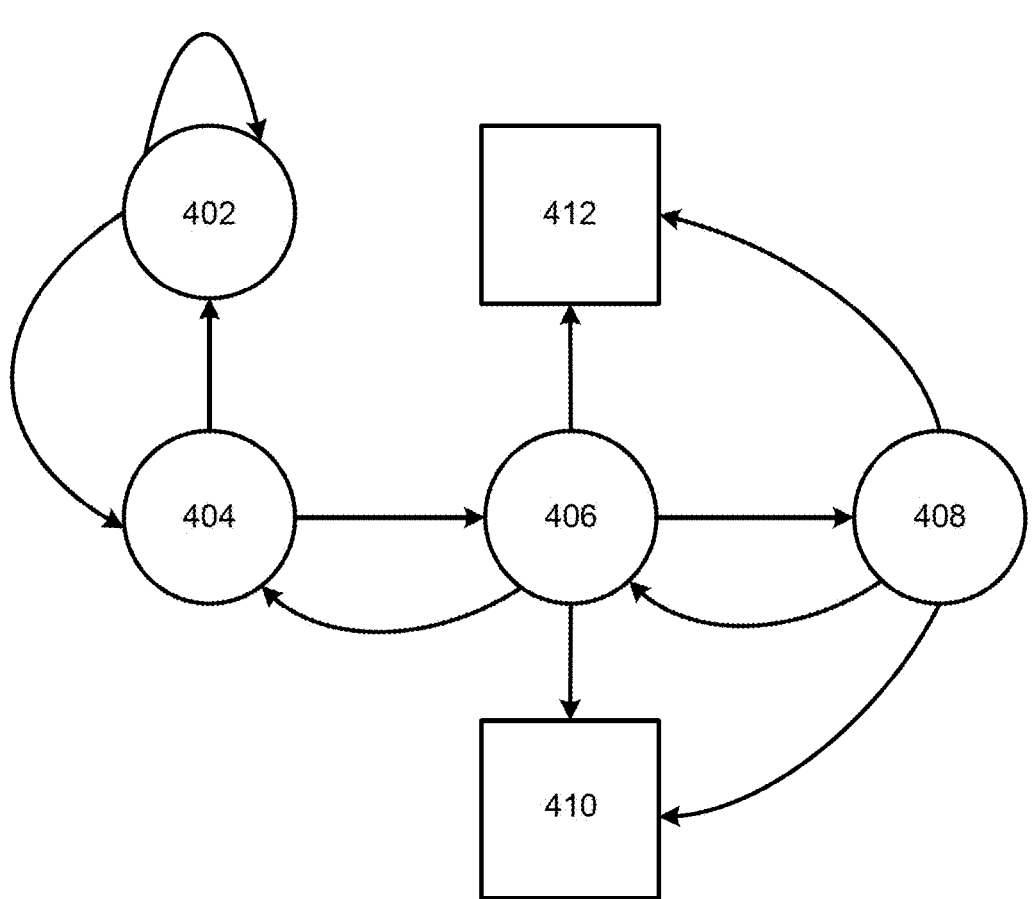
FIG. 4 illustrates a Markov decision process (MDP), in accordance with one or more embodiments.

FIG. 4 illustrates a Markov decision process (MDP) 400, in accordance with one or more embodiments. MDP 400 may include state 402, state 404, state 406, state 408, state 410, and state 412. The states may represent traffic load, types of data packets waiting for transmission, available bandwidth, the status of network nodes, or other network conditions. In some embodiments, each status may be associated with a reward (e.g., R=0, R=1, R=-1, etc.). The arrows between states may be actions. For example, the arrows may represent routing decisions. As an illustrative example, state 402 may represent high network congestion and may be associated with a reward of R=-1. An action that prioritizes every data packet in a network as high priority may cause the system to remain in state 402 (e.g., high congestion), thus earning an agent a negative reward (e.g., R=-1). An action prioritizing the most important 50% of data packets may result in the state transitioning from state 402 to state 404. State 404 may represent medium network congestion and may be associated with a reward of R=1. The transition to state 404 may thus earn the agent a positive reward (e.g., R=1). The agent may take other actions to transition to state 406, state 408, or state 410. For example, an action prioritizing data packets according to a range of different levels of importance may result in the state transitioning from state 404 to state 406. State 406 may represent low network congestion and may be associated with a reward of R=2. The transition to state 406 may thus earn the agent a larger positive reward (e.g., R=2). In some embodiments, state 410 and state 412 may represent terminal states. For example, state 410 may represent a state in which one or more data packets have failed to reach their destination. For example, one or more data packets may have been lost or stuck somewhere in the network. State 412 may represent a state in which all data packets have been successfully routed from a source or a destination. In a terminal state, prioritizing packets for a given session is completed, and no further actions may be required in the context of the MDP.

As an illustrative example, priority subsystem 118 may use an MDP to determine value of people (e.g., customers) within an organization. This may involve modeling a person's interactions and behavior as a series of states and decisions. Each state in the MDP model may represent a different level of customer engagement or satisfaction, ranging from highly satisfied to at risk of leaving the organization. The actions may include various customer retention strategies, such as offering discounts, communication efforts, or other strategies. Transition probabilities in the MDP may reflect the likelihood of a person moving from one state of engagement to another, depending on the action taken. For example, if an organization were to offer a special discount to a person showing signs of reduced engagement (e.g., state 406), the probability of this customer moving to a more engaged state (e.g., state 404) may be considered in the model. Similarly, lack of action or an ineffective strategy may increase the probability of the person transitioning to a state closer to leaving the organization (e.g., from state 406 to state 408). The reward function in this MDP may quantify the benefit of retaining a customer at each engagement level. Actions that successfully enhance customer satisfaction and loyalty may yield higher rewards, reflecting an increased lifetime value and potential revenue from the customer.

Actions that fail to engage or, worse, that alienate the customer, may result in lower rewards. By continually assessing the state of each customer and making decisions based on the expected rewards, an MDP may aim to optimize customer retention strategies based on how people in the organization are prioritized. The MDP may aim to set each person's priority such that the system can implement actions that maximize the likelihood of retaining valuable people, especially those at risk of leaving, while efficiently allocating resources to maintain overall satisfaction and loyalty. In some embodiments, state 410 and state 412 may represent terminal states. For example, state 410 may represent a person charging off, while state 412 may represent a cure for a person's situation. In some embodiments, the states may represent other scenarios in other contexts, and the MDP may be used to predict these and other transitions.

Returning to FIG. 1, priority subsystem 118 may determine a first confidence score for the first predicted path (e.g., first predicted path 306) based on the priority of the first candidate and a first distance associated with the first predicted path. For example, a first confidence score may indicate a likelihood that the data packet will follow the first predicted path. In some embodiments, the first confidence score may indicate a desirability of the data packet following the first predicted path. For example, based on the priority of the first candidate and the first distance of the first predicted path, priority subsystem 118 may assign a low confidence score based on determining that the first distance is too long given the priority of the first candidate. In some embodiments, priority subsystem 118 may determine the first confidence score further based on the first predicted destination. For example, priority subsystem 118 may assign a low confidence score based on determining that the first predicted destination is not appropriate given the priority of the first candidate. As an illustrative example, the first candidate may be a high-priority data packet and the first predicted destination may be a public server. Priority subsystem 118 may assign a low confidence score to the first predicted path based on determining that the public server is not an appropriate destination for the first candidate. For example, a secure server may be a more appropriate destination given the high priority.

Priority subsystem 118 may determine whether the first confidence score associated with selecting the first predicted path for the first message exceeds a threshold. For example, a threshold may be a minimum confidence in the first predicted path that is acceptable. In some embodiments, the threshold may differ based on priority. For example, higher-priority candidates may require higher confidence thresholds than lower-priority candidates. In some embodiments, the threshold may be predetermined, based on other factors, or based on a combination of factors.

Based on determining that the first confidence score for the first predicted path does not exceed the threshold, routing subsystem 116 may select a different path for the first candidate. In some embodiments, routing subsystem 116 may select the different path such that a second confidence score for the different path exceeds the threshold. For example, routing subsystem 116 may select the different path based on the priority of the first candidate and a second distance associated with the different path. For example, the priority of the first candidate may be low. Accordingly, routing subsystem 116 may select a different path that has a longer distance than the first predicted path. The longer distance may represent a lower cost associated with the different path. Thus, the longer path may be associated with the low-priority candidate. In some embodiments, routing subsystem 116 may select the different path further based on the different path connecting the source and the first predicted destination via a different route than the first predicted path. For example, routing subsystem 116 may select a different route that is shorter than the first predicted path, that travels along different nodes, or that otherwise travels a different route. In some embodiments, routing subsystem 116 may select the different path based on the different path connecting the source with a different destination than the first predicted destination. For example, the first predicted destination for a high-priority candidate may be a public server. Routing subsystem 116 may select a different path connecting the source with a secure server, as a secure destination may be more appropriate given the high priority of the candidate.

Figure 5:
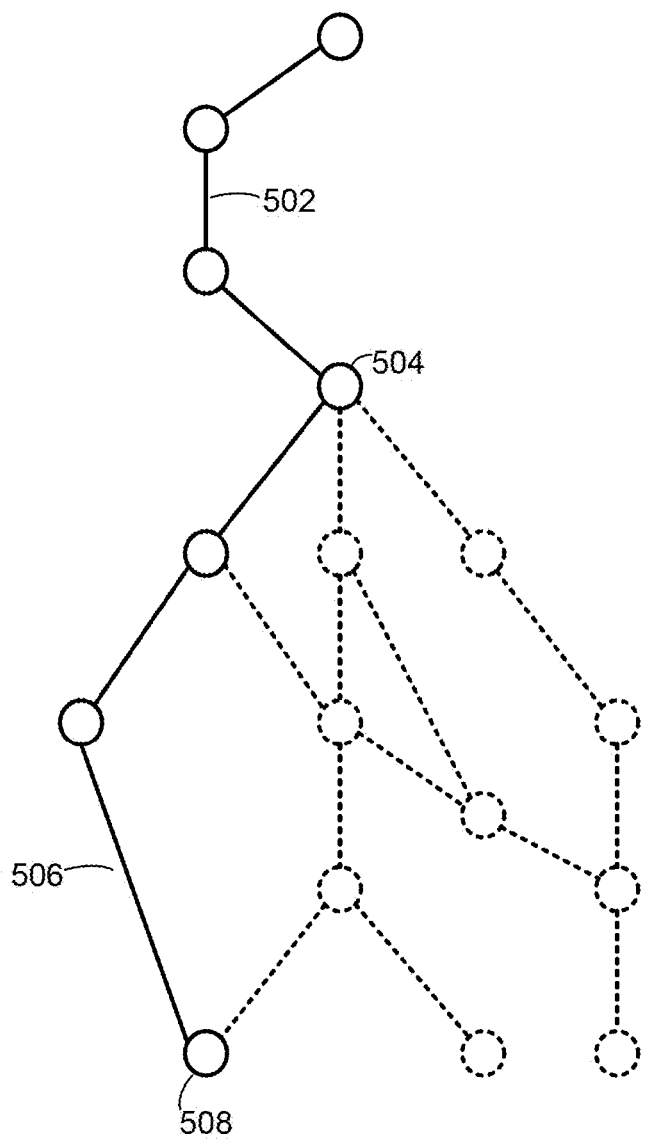
FIG. 5 illustrates a second predicted path between a source and a second destination, in accordance with one or more embodiments.

FIG. 5 illustrates a second predicted path 506 between a source 504 and a second destination 508, in accordance with one or more embodiments. In some embodiments, FIG. 5 may include a plurality of paths 500. In some embodiments, plurality of paths 500 may be the same as plurality of paths 300, as shown in FIG. 3. Plurality of paths 500 may include path 502 that a candidate has already followed to reach source 504. Source 504 may be a current location or a new starting point of the candidate. In some embodiments, multiple paths may connect source 504 with second destination 508, including second predicted path 506. In some embodiments, second destination 508 may represent a new outcome for the candidate. For example, second destination 508 may be a desired outcome for the candidate. As an illustrative example, source 504 may represent a current status of a person within an organization. For example, the current status may include two accounts, one of which is overdrawn. In some embodiments, second predicted path 506 may represent a series of future actions for the person. For example, nodes along second predicted path 506 may include on-time payments, payment extensions, customer service offers, or other actions. In some embodiments, second destination 508 may include an outcome expected for the person. For example, second destination 508 may include the person paying off all balances owed to the organization.

In some embodiments, routing subsystem 116 may re-direct a candidate along the different path. Returning to FIG. 1, communication subsystem 112 may receive a plurality of rules for re-directing candidates to selected paths. In some embodiments, the rules may include external rules, such as local, state, and federal regulations. As an example, external rules may include prohibitions against contacting certain candidates using certain methods of contact. In some embodiments, the rules may include internal organization rules. For example, internal rules may include a prohibition against multiple contacts to a candidate within one day.

In some embodiments, routing subsystem 116 may determine a strategy for re-directing a first candidate from a first predicted path to a different path. As an illustrative example, the strategy may involve methods for contacting the first candidate. Methods for contacting may involve a medium of contact (e.g., telephone, in-person, text, email, or other methods of reaching the candidate). The methods of contact may include content of the contact (e.g., a particular message that is delivered, how that message is delivered, what information is or is not included with the message, or other content). The strategy may further involve a schedule for contacting the first candidate (e.g., a time, a date, a frequency, or another schedule). For example, the schedule may include an interval for contacting the candidate and which methods of contact will be used for each instance of contact. In some embodiments, the methods of contact may include circumstances surrounding the contact (e.g., contacting the person at a workplace, on a payday, on rainy days, or other circumstances). In some embodiments, the methods of contact may account for scenarios related to the reason for contact (e.g., a day prior to an escalation in interest rate, a day prior to a debt being transferred to a third-party collection agency, etc.). An example schedule may include emailing the candidate one week before a due date, texting the candidate two days before the due date during work hours, and calling the candidate on the day of the due date before work hours. In some embodiments, the methods of contact may include user-initiated contact strategies, provider-initiated contact strategies, trigger-based contact strategies, or other types of strategies. In some embodiments, various strategies may be associated with different costs. For example, different methods of contact may have different costs for an organization. In some embodiments, more contacts may be costlier to the organization than fewer contacts. In some embodiments, the strategy may include offering various rewards, extensions, or other incentives to a person in order to re-direct them. These incentives may each have an associated cost. In some embodiments, routing subsystem 116 may determine the strategy for re-routing the candidate based on the costs associated with different strategies. In some embodiments, routing subsystem 116 may compare the costs of a strategy to an outstanding debt or a probability of a result using the contact strategy before determining that a particular contact strategy is available for the person.

In some embodiments, routing subsystem 116 may compare the strategy with the received rules to determine whether the strategy violates any rules. If the strategy does not violate the rules, routing subsystem 116 may approve the strategy. In some embodiments, a candidate may be on a do-not-call list. In this case, a contact strategy involving calling the candidate may violate the rules. Routing subsystem 116 may determine a different strategy and may compare the different strategy to the rules to determine that it does not violate the rules. Once the different strategy does not violate the rules, routing subsystem 116 may approve the different strategy.

In some embodiments, the strategy may be adjusted or canceled based on actions or updates from the candidate. For example, priority subsystem 118 may monitor the first candidate for updates to the priority of the first candidate. As an example, a first candidate's priority may change dynamically based on actions taken by the first candidate. For example, a candidate may open a new account, close an account, overdraw an account, make a payment, call customer service, request an extension, or take another action. Each action or a combination of actions may affect the candidate's priority. In some embodiments, the first candidate's priority may change based on actions of other candidates. For example, the first candidate's priority may be relative to other candidates' priorities and thus a change to other candidates' priorities may affect the first candidate's priority. Priority subsystem 118 may detect an updated priority of the first candidate. Based on detecting the updated priority, routing subsystem 116 may select an updated path for the first candidate. Routing subsystem 116 may select the updated path based on the updated priority of the first candidate and a third distance associated with the updated path. For example, the third distance may represent a different cost associated with routing the first candidate along the updated path. In some embodiments, routing subsystem 116 may select the updated path using any of the methods previously discussed herein. In some embodiments, routing subsystem 116 may select the updated path such that a third confidence score for the updated path exceeds a threshold.

As an illustrative example, message routing system 102 may determine strategies for directing people within an organization from a current state to a desired outcome. Routing subsystem 116 may use a first machine learning model to determine, for a first person, a first predicted path. The first predicted path may represent a series of future actions that the person is predicted to take. For example, the first predicted path may involve the person missing payments, overdrawing accounts, and eventually charging off. Priority subsystem 118 may determine, based on the first predicted path, a priority of the first person using a Markov decision process. Message routing system 102 may determine whether the first predicted path is appropriate for the first person based on the priority of the first person. For example, the person may be valuable to the organization but the first predicted path may lead the person to leave the organization. Priority subsystem 118 may thus determine that the first predicted path is not appropriate for the person based on the person's high priority. Based on determining that the first predicted path is not appropriate, routing subsystem 116 may select a different path for the person. The different path may connect the source with a different destination (e.g., the person remaining in the organization and continuing to contribute value). For example, the different path may involve the person making on-time payments, contacting customer service, and ultimately maintaining their accounts with the organization. Message routing system 102 may select the different path based on the priority of the person, the costs of pursuing the first predicted path versus the different path, and the different destination. Thus, routing subsystem 116 may re-direct the person down a path (e.g., the different path) that is appropriate given the priority of the person. In some embodiments, routing subsystem 116 may additionally account for rules (e.g., local, state, and federal regulations, internal organization rules, or other rules) and may re-direct the person using methods that are in compliance with those rules. For example, if a strategy for re-directing the person involves contacting the person with payment reminders but the person is on a do-not-call list, communication subsystem 112 may select alternative methods of contact (e.g., email) to communicate with the person. Communication subsystem 112 may then initiate permissible methods of re-directing the person to the different path.

Figure 6:
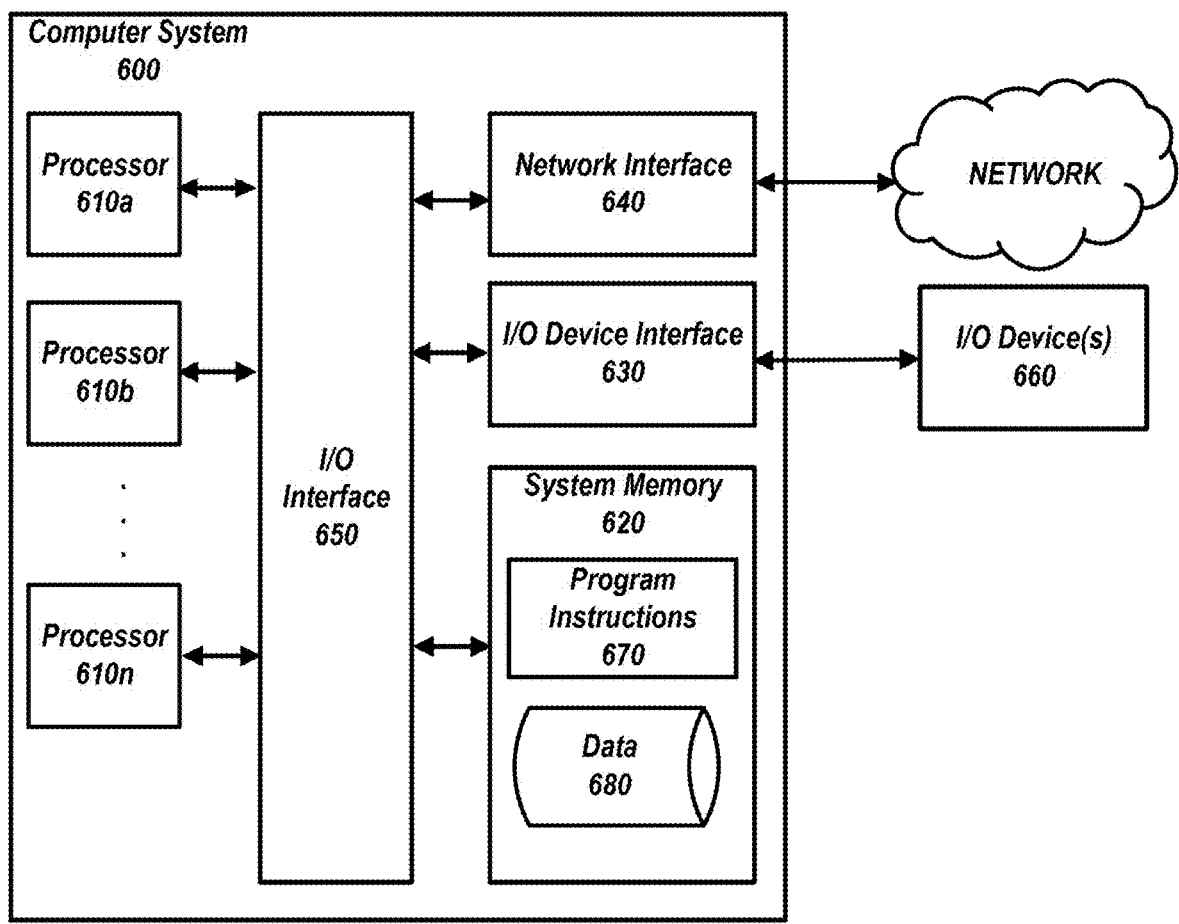
FIG. 6 illustrates a computing device, in accordance with one or more embodiments.

FIG. 6 shows an example computing system 600 that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may include a graphics processing unit (GPU) that supports a CPU. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehiclemounted computer, a Global Positioning System (GPS), or the like. Computing system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
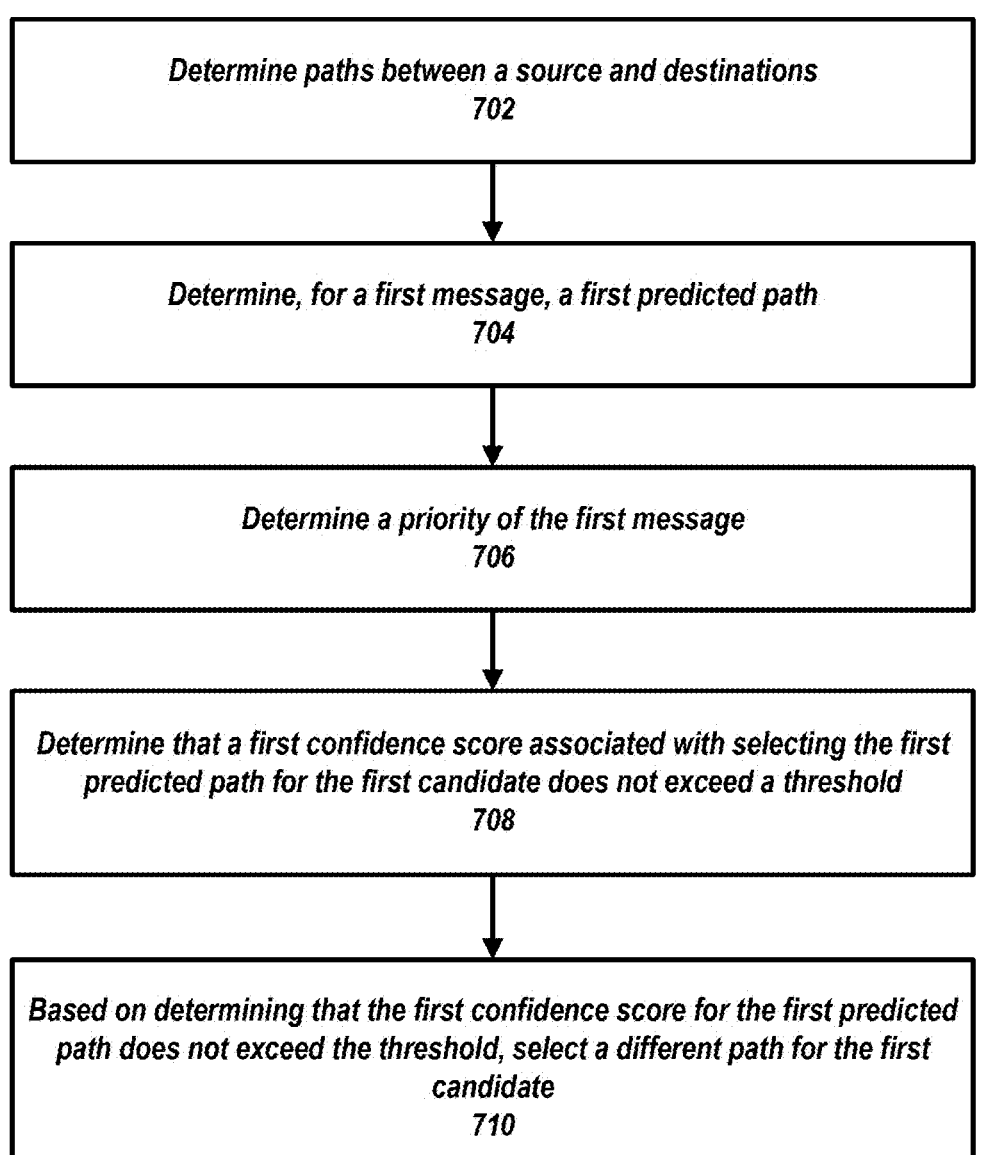
FIG. 7 shows a flowchart of the process for routing candidates based on priorities, in accordance with one or more embodiments.

FIG. 7 shows a flowchart of the process 700 for routing candidates based on priority, in accordance with one or more embodiments. For example, the system may use process 700 (e.g., as implemented on one or more system components described above) to route data packets such as messages along paths between a source and destinations in a network.

At 702, message routing system 102 (e.g., using one or more of processors 610a-610n) may determine paths between a source and destinations. For example, message routing system 102 may determine paths for routing messages from the source to one or more destinations. Each path may be associated with a respective distance between the source and a respective destination of the one or more destinations. Message routing system 102 may determine the paths using one or more of system memory 620, data 680, or the network.

At 704, message routing system 102 (e.g., using one or more of processors 610a-610n) may determine, for a first message, a first predicted path. For example, message routing system 102 may determine a first predicted path using a machine learning model. The first predicted path may connect the source and a first predicted destination of the one or more destinations. Message routing system 102 may determine the first predicted path using one or more of processors 610a-610n.

At 706, message routing system 102 (e.g., using one or more of processors 610a-610n) may determine a priority of the first message. For example, message routing system 102 may determine the priority based on the first predicted path. Message routing system 102 may determine the priority of the first message using a Markov decision process (MDP). In some embodiments, the MDP utilizes agent input and a probabilistic determination to determine the priority of the first message. Message routing system 102 may determine the priority using one or more of processors 610a-610n.

At 708, message routing system 102 (e.g., using one or more of processors 610a-610n) may determine that a first confidence score associated with selecting the first predicted path for the first message does not exceed a threshold. For example, message routing system 102 may determine the first confidence score based on the priority of the first message and a first distance associated with the first predicted path. In some embodiments, message routing system 102 may determine the first confidence score further based on the first predicted destination. Message routing system 102 may determine that the first confidence score does not exceed the threshold using one or more of processors 610a-610n.

At 710, message routing system 102 (e.g., using one or more of processors 610a-610n) may select a different path for the first message based on determining that the first confidence score for the first predicted path does not exceed the threshold. For example, the different path may connect the source and a second predicted destination of the one or more destinations. Message routing system 102 may select the different path based on the priority of the first message and a second distance associated with the different path. In some embodiments, message routing system 102 may select the different path further based on the second predicted destination. In some embodiments, a second confidence score for the different path exceeds the threshold. Message routing system 102 may select the different path using one or more of processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising determining a plurality of paths for routing messages from a source to one or more destinations, wherein each path of the plurality of paths is associated with a respective distance between the source and a respective destination of the one or more destinations, determining, for a first message of a plurality of messages, using a machine learning model, a first predicted path of the plurality of paths, the first predicted path connecting the source and a first predicted destination of the one or more destinations, determining, based on the first predicted path, a priority of the first message using a Markov decision process, wherein the Markov decision process utilizes agent input and a probabilistic determination, determining whether a first confidence score associated with selecting the first predicted path for the first message exceeds a threshold, wherein the first confidence score is determined based on the priority of the first message, a first distance associated with the first predicted path, and the first predicted destination, and based on determining that the first confidence score for the first predicted path does not exceed the threshold, selecting a different path of the plurality of paths for the first message, the different path connecting the source and a second predicted destination of the one or more destinations, wherein the different path is selected based on the priority of the first message, a second distance associated with the different path, and the second predicted destination, wherein a second confidence score for the different path exceeds the threshold.

2. A method comprising determining a plurality of paths between a source and one or more destinations, wherein each path of the plurality of paths is associated with a respective distance between the source and a respective destination of the one or more destinations, determining, for a first candidate of a plurality of candidates, using a first model, a first predicted path of the plurality of paths, determining, based on the first predicted path, using a second model, a priority of the first candidate using agent input and a probabilistic determination, determining that a first confidence score associated with selecting the first predicted path for the first candidate does not exceed a threshold, wherein the first confidence score is determined based on the priority of the first candidate and a first distance associated with the first predicted path, and based on determining that the first confidence score for the first predicted path does not exceed the threshold, selecting a different path of the plurality of paths for the first candidate, wherein the different path is selected based on the priority of the first candidate and a second distance associated with the different path, wherein a second confidence score for the different path exceeds the threshold.

3. A method comprising determining a plurality of paths between a source and one or more destinations, wherein each path of the plurality of paths is associated with a respective distance between the source and a respective destination of the one or more destinations, determining, for a first candidate of a plurality of candidates, using a first model, a first predicted path of the plurality of paths, determining, based on the first predicted path, using a second model, a priority of the first candidate using agent input and a probabilistic determination, determining that a first confidence score associated with selecting the first predicted path for the first candidate does not exceed a threshold, and based on determining that the first confidence score for the first predicted path does not exceed the threshold, selecting a different path of the plurality of paths for the first candidate, wherein a second confidence score for the different path exceeds the threshold.

4. The method of any one of the preceding embodiments, wherein determining the priority of the first candidate comprises determining the priority using a Markov decision process, wherein the Markov decision process utilizes the agent input and the probabilistic determination.

5. The method of any one of the preceding embodiments, further comprising monitoring the first candidate for updates to the priority of the first candidate, detecting an updated priority of the first candidate, and based on detecting the updated priority, selecting an updated path of the plurality of paths for the first candidate, wherein the updated path is selected based on the updated priority of the first candidate and a third distance associated with the updated path, wherein a third confidence score for the updated path exceeds the threshold.

6. The method of any one of the preceding embodiments, wherein the first predicted path connects the source and a first predicted destination of the one or more destinations.

7. The method of any one of the preceding embodiments, further comprising determining the first confidence score further based on the first predicted destination.

8. The method of any one of the preceding embodiments, wherein the different path connects the source and a second predicted destination of the one or more destinations, further comprising selecting the different path further based on the second predicted destination.

9. The method of any one of the preceding embodiments, further comprising selecting the different path further based on the different path connecting the source and the first predicted destination via a different route than the first predicted path.

10. The method of any one of the preceding embodiments, further comprising receiving a plurality of rules for re-directing candidates to selected paths of the plurality of paths, determining a strategy for re-directing the first candidate from the first predicted path to the different path, wherein the strategy comprises one or more of a method for contacting the first candidate and a schedule for contacting the first candidate, and comparing the strategy with the plurality of rules to determine whether the strategy violates any rules of the plurality of rules.

11. The method of any one of the preceding embodiments, further comprising determining that the strategy does not violate the plurality of rules, and approving the strategy for re-directing the first candidate from the first predicted path to the different path.

12. The method of any one of the preceding embodiments, further comprising determining that the strategy violates one or more rules of the plurality of rules, determining a different strategy for re-directing the first candidate from the first predicted path to the different path, comparing the different strategy with the plurality of rules, determining that the different strategy does not violate the plurality of rules, and approving the different strategy for re-directing the first candidate from the first predicted path to the different path.

13. One or more non-transitory, computer-readable media storing computer-executable instructions that, when executed by one or more data processing apparatuses, cause operations comprising those of any of embodiments 1-12.

14. A system comprising one or more processors and memory storing instructions that, when executed by the processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:

1. A system for routing messages based on priorities, the system comprising:

one or more processors and one or more non-transitory computer-readable media having computer-executable instructions stored thereon, the computer-executable instructions, when executed by the one or more processors, causing operations comprising:

determining a plurality of paths for routing messages from a source to one or more destinations, wherein each path of the plurality of paths is associated with a respective distance between the source and a respective destination of the one or more destinations;

determining, for a first message of a plurality of messages, using a machine learning model, a first predicted path of the plurality of paths, the first predicted path connecting the source and a first predicted destination of the one or more destinations;

determining, based on the first predicted path, a priority of the first message using a Markov decision process, wherein the Markov decision process utilizes agent input and a probabilistic determination;

determining whether a first confidence score associated with selecting the first predicted path for the first message exceeds a threshold, wherein the first con-fidence score is determined based on the priority of the first message, a first distance associated with the first predicted path, and the first predicted destination; and based on determining that the first confidence score for the first predicted path does not exceed the threshold, selecting a different path of the plurality of paths for the first message, the different path connecting the source and a second predicted destination of the one or more destinations, wherein the different path is selected based on the priority of the first message, a second distance associated with the different path, and the second predicted destination, wherein a second confidence score for the different path exceeds the threshold.

2. A method comprising:

determining a plurality of paths between a source and one or more destinations, wherein each path of the plurality of paths is associated with a respective distance between the source and a respective destination of the one or more destinations;

determining, for a first candidate of a plurality of candidates, using a first model, a first predicted path of the plurality of paths;

determining, based on the first predicted path, using a second model, a priority of the first candidate using agent input and a probabilistic determination;

determining that a first confidence score associated with selecting the first predicted path for the first candidate does not exceed a threshold, wherein the first confidence score is determined based on the priority of the first candidate and a first distance associated with the first predicted path; and based on determining that the first confidence score for the first predicted path does not exceed the threshold, selecting a different path of the plurality of paths for the first candidate, wherein the different path is selected based on the priority of the first candidate and a second distance associated with the different path, wherein a second confidence score for the different path exceeds the threshold.

3. The method of claim 2, wherein determining the priority of the first candidate comprises determining the priority using a Markov decision process, wherein the Markov decision process utilizes the agent input and the probabilistic determination.

4. The method of claim 2, further comprising:

monitoring the first candidate for updates to the priority of the first candidate;

detecting an updated priority of the first candidate; and based on detecting the updated priority, selecting an updated path of the plurality of paths for the first candidate, wherein the updated path is selected based on the updated priority of the first candidate and a third distance associated with the updated path, wherein a third confidence score for the updated path exceeds the threshold.

5. The method of claim 2, wherein the first predicted path connects the source and a first predicted destination of the one or more destinations.

6. The method of claim 5, further comprising determining the first confidence score further based on the first predicted destination.

7. The method of claim 6, wherein the different path connects the source and a second predicted destination of the one or more destinations, further comprising selecting the different path further based on the second predicted destination.

8. The method of claim 5, further comprising selecting the different path further based on the different path connecting the source and the first predicted destination via a different route than the first predicted path.

9. The method of claim 2, further comprising:

receiving a plurality of rules for re-directing candidates to selected paths of the plurality of paths;

determining a strategy for re-directing the first candidate from the first predicted path to the different path, wherein the strategy comprises one or more of a method for contacting the first candidate and a schedule for contacting the first candidate; and comparing the strategy with the plurality of rules to determine whether the strategy violates any rules of the plurality of rules.

10. The method of claim 9, further comprising:

determining that the strategy does not violate the plurality of rules; and approving the strategy for re-directing the first candidate from the first predicted path to the different path.

11. The method of claim 9, further comprising:

determining that the strategy violates one or more rules of the plurality of rules;

determining a different strategy for re-directing the first candidate from the first predicted path to the different path;

comparing the different strategy with the plurality of rules;

determining that the different strategy does not violate the plurality of rules; and approving the different strategy for re-directing the first candidate from the first predicted path to the different path.

12. One or more non-transitory, computer-readable media storing instructions that, when executed by one or more processors, cause operations comprising:

determining a plurality of paths between a source and one or more destinations, wherein each path of the plurality of paths is associated with a respective distance between the source and a respective destination of the one or more destinations;

determining, for a first candidate of a plurality of candidates, using a first model, a first predicted path of the plurality of paths;

determining, based on the first predicted path, using a second model, a priority of the first candidate using agent input and a probabilistic determination;

determining that a first confidence score associated with selecting the first predicted path for the first candidate does not exceed a threshold; and based on determining that the first confidence score for the first predicted path does not exceed the threshold, selecting a different path of the plurality of paths for the first candidate, wherein a second confidence score for the different path exceeds the threshold.

13. The one or more non-transitory, computer-readable media of claim 12, wherein determining the priority of the first candidate comprises determining the priority using a Markov decision process, wherein the Markov decision process utilizes the agent input and the probabilistic determination.

14. The one or more non-transitory, computer-readable media of claim 12, wherein the first predicted path connects the source and a first predicted destination of the one or more destinations, and wherein the instructions further cause the one or more processors to perform operations comprising determining the first confidence score based on the first predicted destination, the priority of the first candidate, and a first distance associated with the first predicted path.

15. The one or more non-transitory, computer-readable media of claim 14, wherein the different path connects the source and a second predicted destination of the one or more destinations, further comprising selecting the different path further based on the second predicted destination, the priority of the first candidate, and a second distance associated with the different path.

16. The one or more non-transitory, computer-readable media of claim 12, wherein the instructions further cause the one or more processors to perform operations comprising:

monitoring the first candidate for updates to the priority of the first candidate;

detecting an updated priority of the first candidate; and based on detecting the updated priority, selecting an updated path of the plurality of paths for the first candidate, wherein the updated path is selected based on the updated priority of the first candidate and a third distance associated with the updated path, wherein a third confidence score for the updated path exceeds the threshold.

17. The one or more non-transitory, computer-readable media of claim 15, further comprising selecting the different path further based on the different path connecting the source and the first predicted destination via a different route than the first predicted path.

18. The one or more non-transitory, computer-readable media of claim 12, wherein the instructions further cause the one or more processors to perform operations comprising:

receiving a plurality of rules for re-directing candidates to selected paths of the plurality of paths;

determining a strategy for re-directing the first candidate from the first predicted path to the different path, wherein the strategy comprises one or more of a method for contacting the first candidate and a schedule for contacting the first candidate; and comparing the strategy with the plurality of rules to determine whether the strategy violates any rules of the plurality of rules.

19. The one or more non-transitory, computer-readable media of claim 18, wherein the instructions further cause the one or more processors to perform operations comprising:

determining that the strategy does not violate the plurality of rules; and approving the strategy for re-directing the first candidate from the first predicted path to the different path.

20. The one or more non-transitory, computer-readable media of claim 18, wherein the instructions further cause the one or more processors to perform operations further comprising:

determining that the strategy violates one or more rules of the plurality of rules;

determining a different strategy for re-directing the first candidate from the first predicted path to the different path;

comparing the different strategy with the plurality of rules;

determining that the different strategy does not violate the plurality of rules; and approving the different strategy for re-directing the first candidate from the first predicted path to the different path.

* * * * *